Nov. 2, 1937. F. W. ATZ, JR  2,097,909
CONVEYER CONTROL SYSTEM
Original Filed June 21, 1930    6 Sheets-Sheet 1
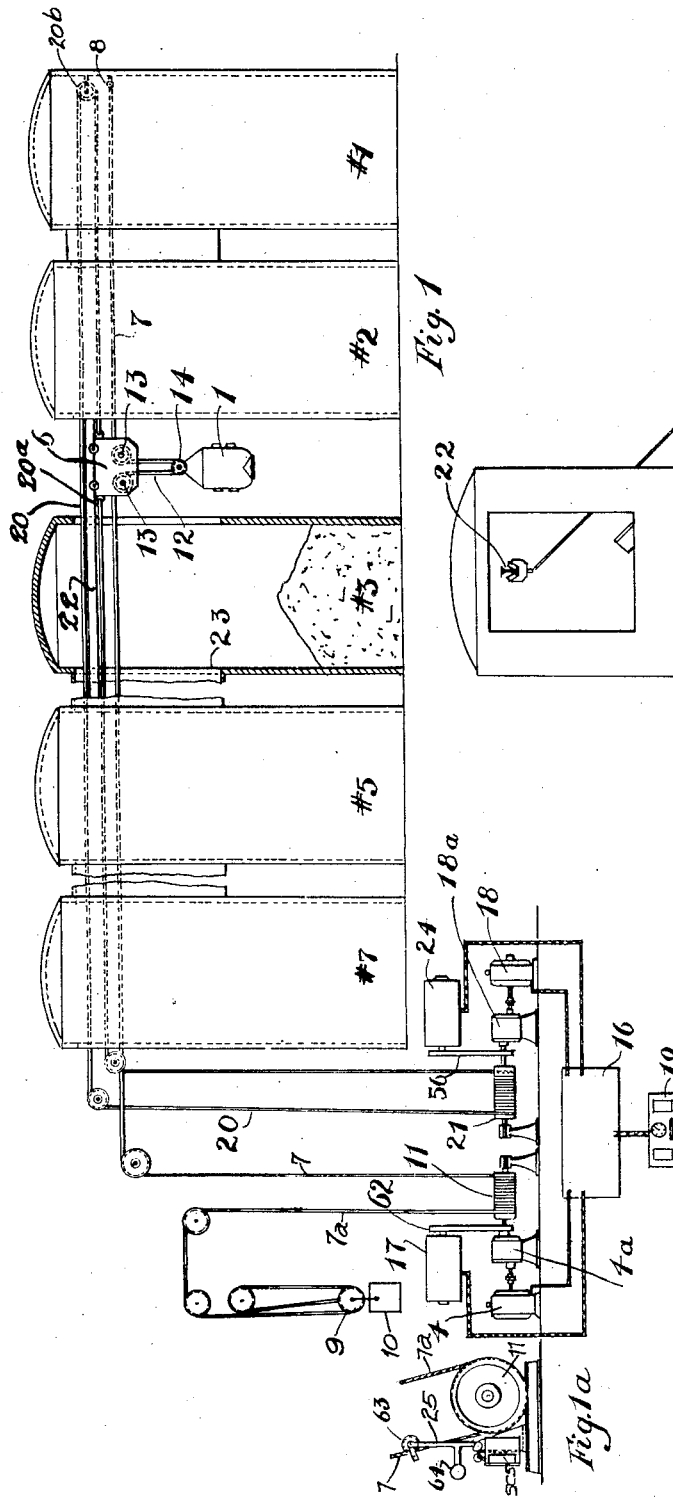
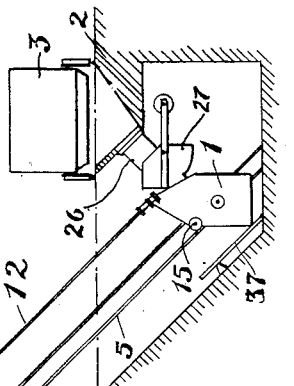
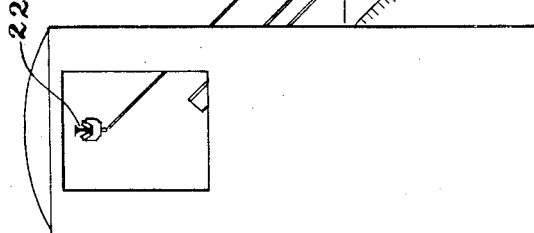

Nov. 2, 1937.  F. W. ATZ, JR  2,097,909
CONVEYER CONTROL SYSTEM
Original Filed June 21, 1930  6 Sheets—Sheet 2
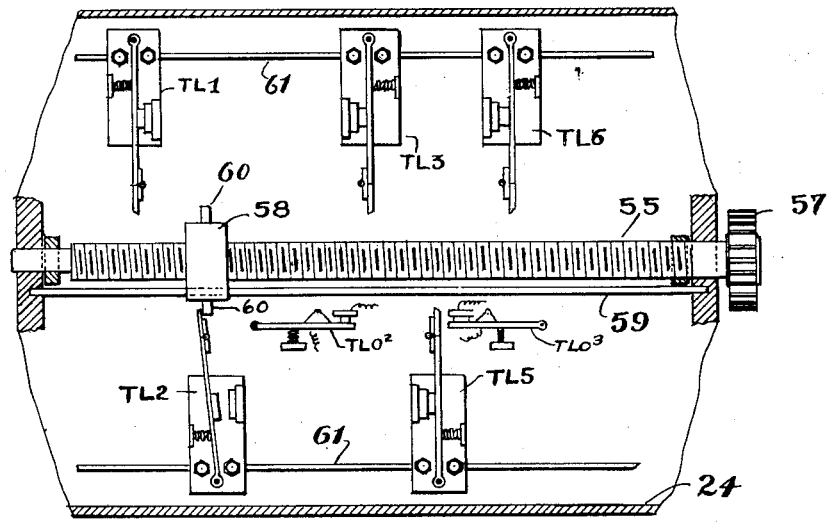
Fig. 7
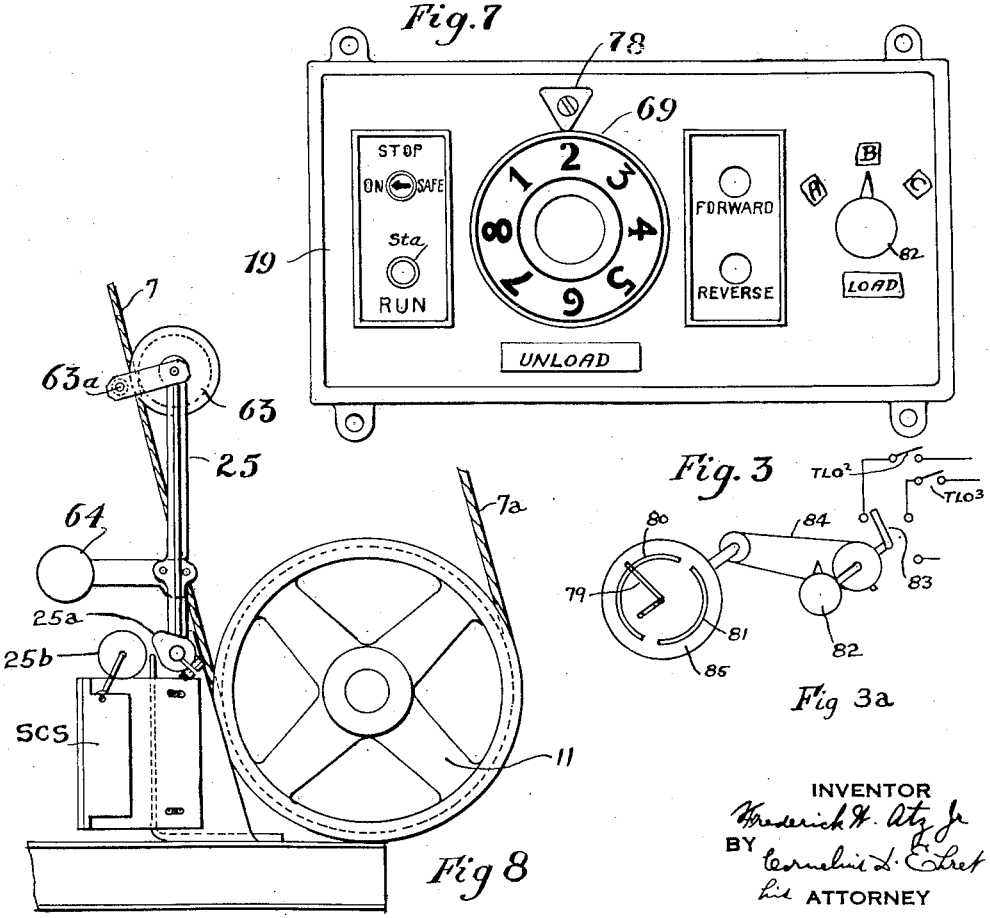
INVENTOR
Frederick W. Atz Jr
BY
Cornelius L. Street
ATTORNEY

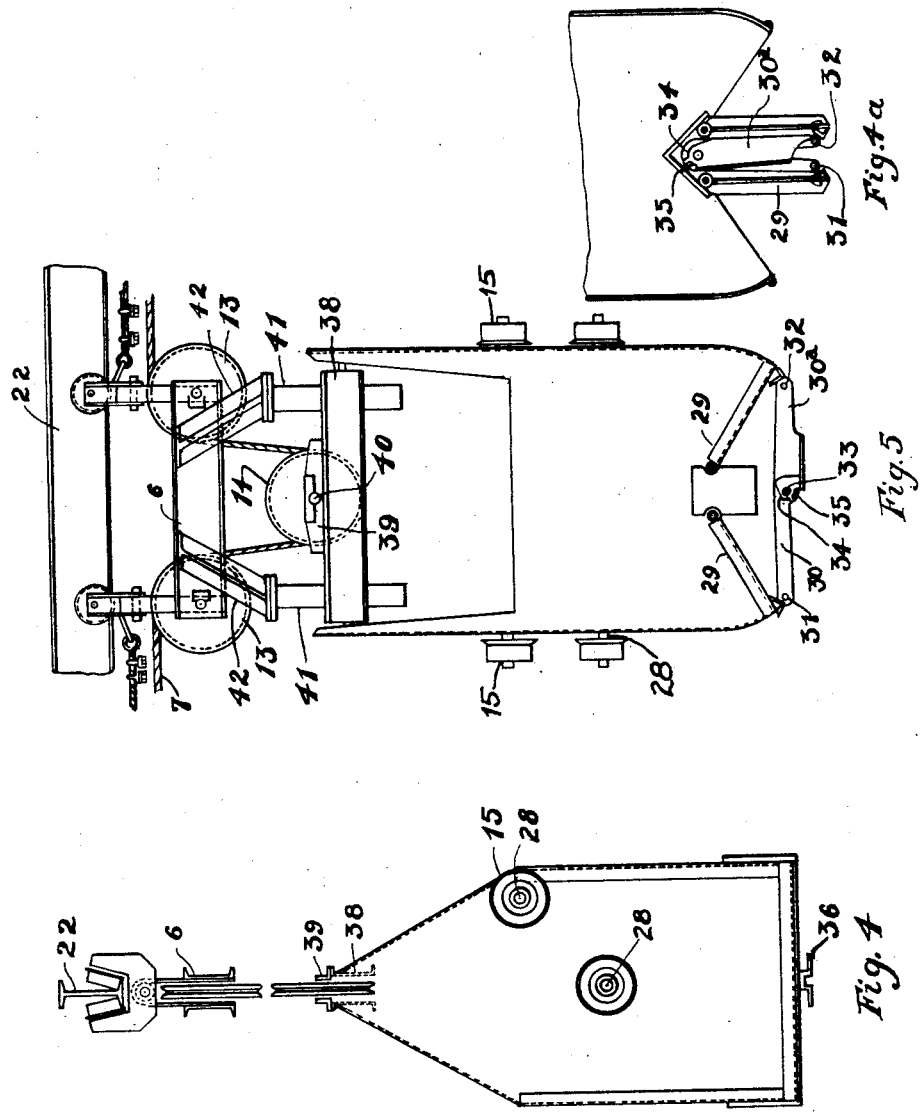

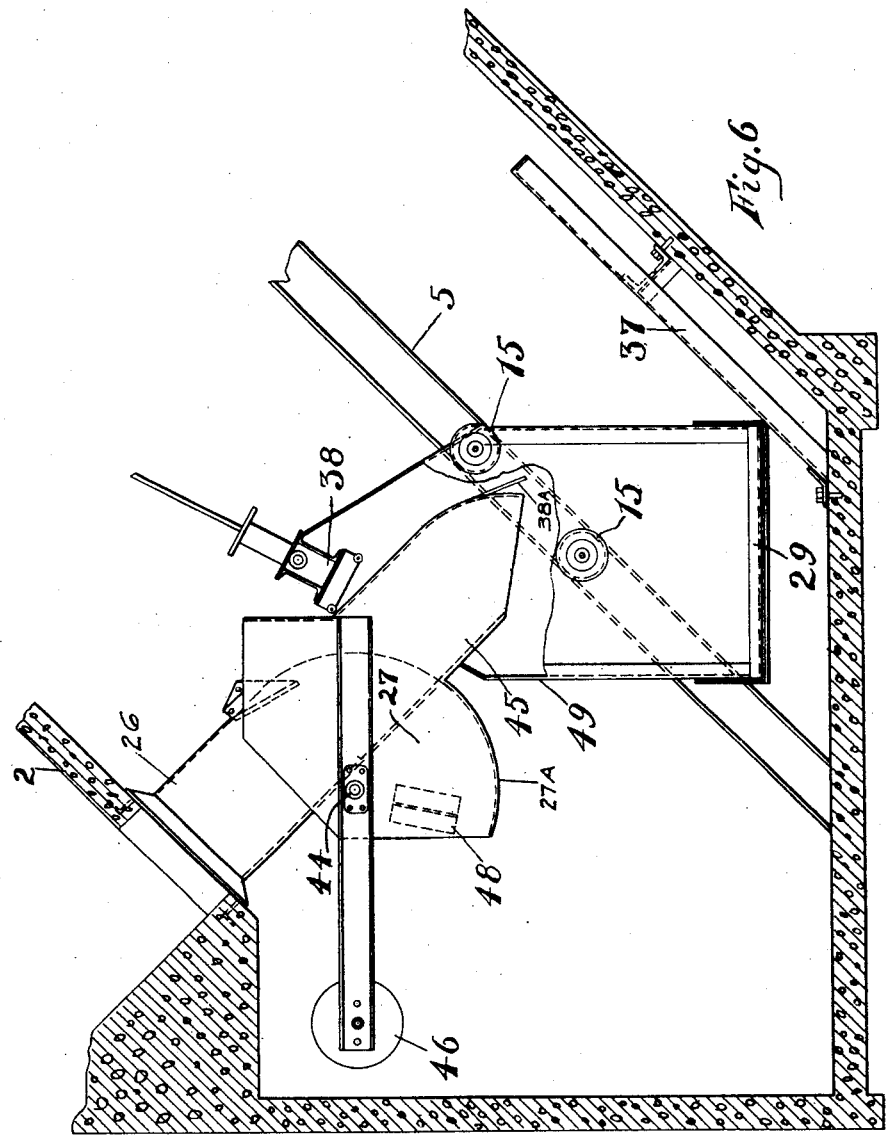

Nov. 2, 1937.　　　F. W. ATZ, JR　　　2,097,909

CONVEYER CONTROL SYSTEM

Original Filed June 21, 1930　　6 Sheets-Sheet 5

INVENTOR
Frederick W. Atz Jr.
BY
his ATTORNEY

Nov. 2, 1937.  F. W. ATZ, JR  2,097,909
CONVEYER CONTROL SYSTEM
Original Filed June 21, 1930   6 Sheets-Sheet 6
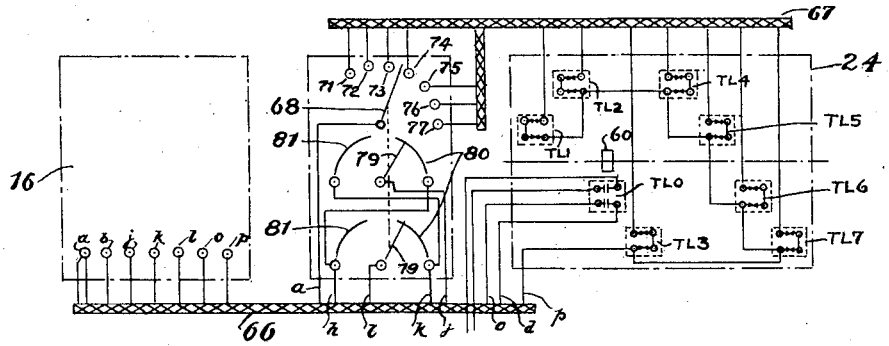
Fig. 10
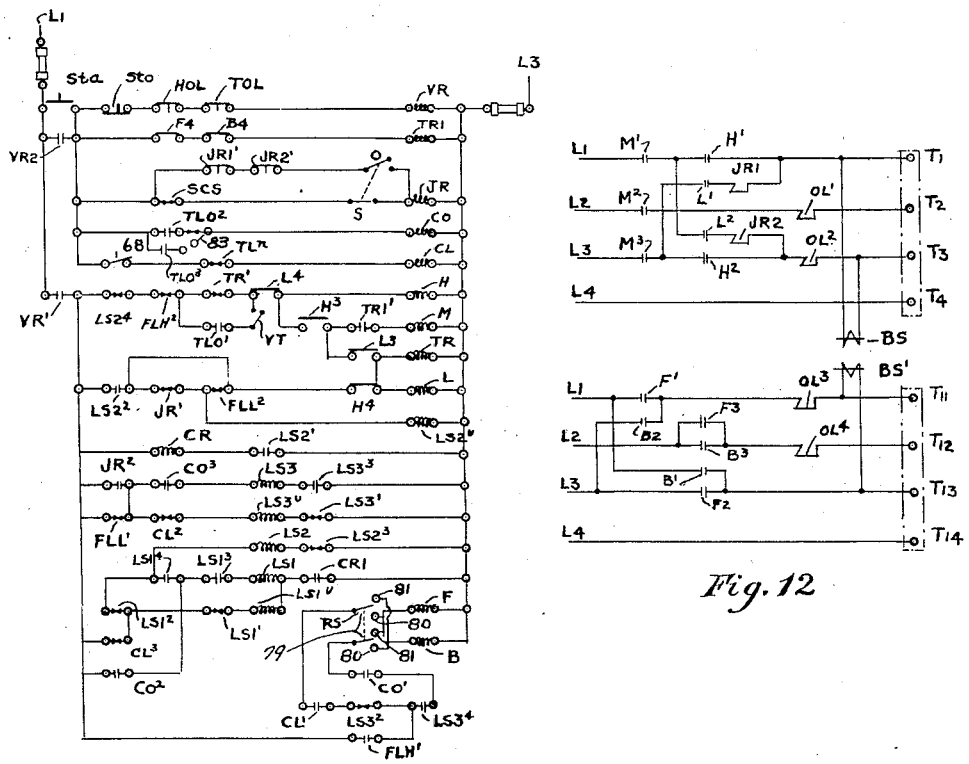
Fig 11
Fig. 12
INVENTOR
Frederick H. Atz Jr
BY Cornelius L. Ehret
his ATTORNEY Patented Nov. 2, 1937

2,097,909

UNITED STATES PATENT OFFICE 2,097,909

CONVEYER CONTROL SYSTEM

Frederick W. Atz, Jr., Philadelphia, Pa., assignor to Link-Belt Company, Chicago, Ill., a corporation of Illinois Application June 21, 1930, Serial No. 462,804
Renewed September 20, 1937

22 Claims. (Cl. 212—126)

My invention relates to apparatus for conveying material from one station to another, and more particularly for transporting material between a station and any one of a group of stations, or between any one of a group of stations and another station.

Heretofore in conveying systems in which the material to be transported is lifted, as from a supply thereof, carried to a position above and then lowered to the discharge or unloading point, with return of the load carrier by the same steps in reverse sequence to its starting position, there was necessary at the end of each step, the intervention of an operator to initiate the next step.

In accordance with my invention, the successive steps of operation occur automatically in sequence without need for guidance or control by an operator, and in a preferred form the cycle, including the steps of loading and unloading, is automatically repeated; more specifically, the material may be discharged at a selected one of several points, the conveying structure travelling back and forth between the loading and any desired unloading point, automatically performing the steps of loading, hoisting, forward travel, lowering and hoisting at the selected station, reverse travel, and lowering to the loading position; and upon selection of another loading or unloading station, or both, the same cycle of operation is performed.

More particularly, in installations in which the material discharged accumulates in a mass of increasing height, the system accommodates itself thereto by automatically decreasing the extent of the lowering and hoisting steps at the unloading station; more specifically, the steps of stopping of the lowering operation, the release or discharge of the material and the subsequent hoisting, are effected by or responsive to, contact of the load carrier with the top of the accumulated material, or generally when the descending load carrier meets with obstruction.

Further in accordance with my invention, operations may be shifted from one unloading station to another, from one loading station to another, or both the loading and unloading stations may be changed, without alteration of the several steps or their sequence. Specifically, the selection is effected by manipulation of manually operable switching mechanism.

Further in accordance with my invention, there is afforded an interval of time sufficient to permit the bucket or load-carrier in hoisted position, whether loaded or unloaded, to cease swinging, between successive steps of hoisting, transport, and lowering.

Further in accordance with my invention, upon arrival at the loading point of the descending empty load carrier, there is afforded a definite time interval for loading before the conveyer is hoisted.

Further in accordance with my invention, in an automatic system providing the various steps in the operation of a load carrier or bucket, there are provided manual controls for interrupting automatic operation or control, and thereafter controlling the movement of the bucket or conveyer from point to point, with resumption of automatic control, if and when desired; and more particularly, in connection with the manual control aforesaid, there is provided an interlock preventing such manipulation of the control switches as would result in simultaneous energization of the hoisting and lowering motor and the motor effecting transport of the bucket or conveyer.

Further in accordance with my invention, all of the automatic control apparatus, including, if desired, the aforesaid manual control, is disposed in one and the same control house, in which are preferably disposed also the aforesaid motors.

My invention further resides in the features of construction, combination, operation, and arrangement hereinafter described and claimed.

For an understanding of my invention and for illustration of one of the various forms an installation embodying my invention may take, reference is to be had to the accompanying drawings, in which:

Fig. 1 represents diagrammatically a complete system for transporting material to storage bins or silos.

Fig. 1a is a detail view in elevation of parts shown in Fig. 1.

Fig. 2 is an end elevational view of Fig. 1, additionally disclosing one type of loading station.

Fig. 3 shows in front elevation and on enlarged scale, a manual control panel appearing in Fig. 1.

Figure 9:
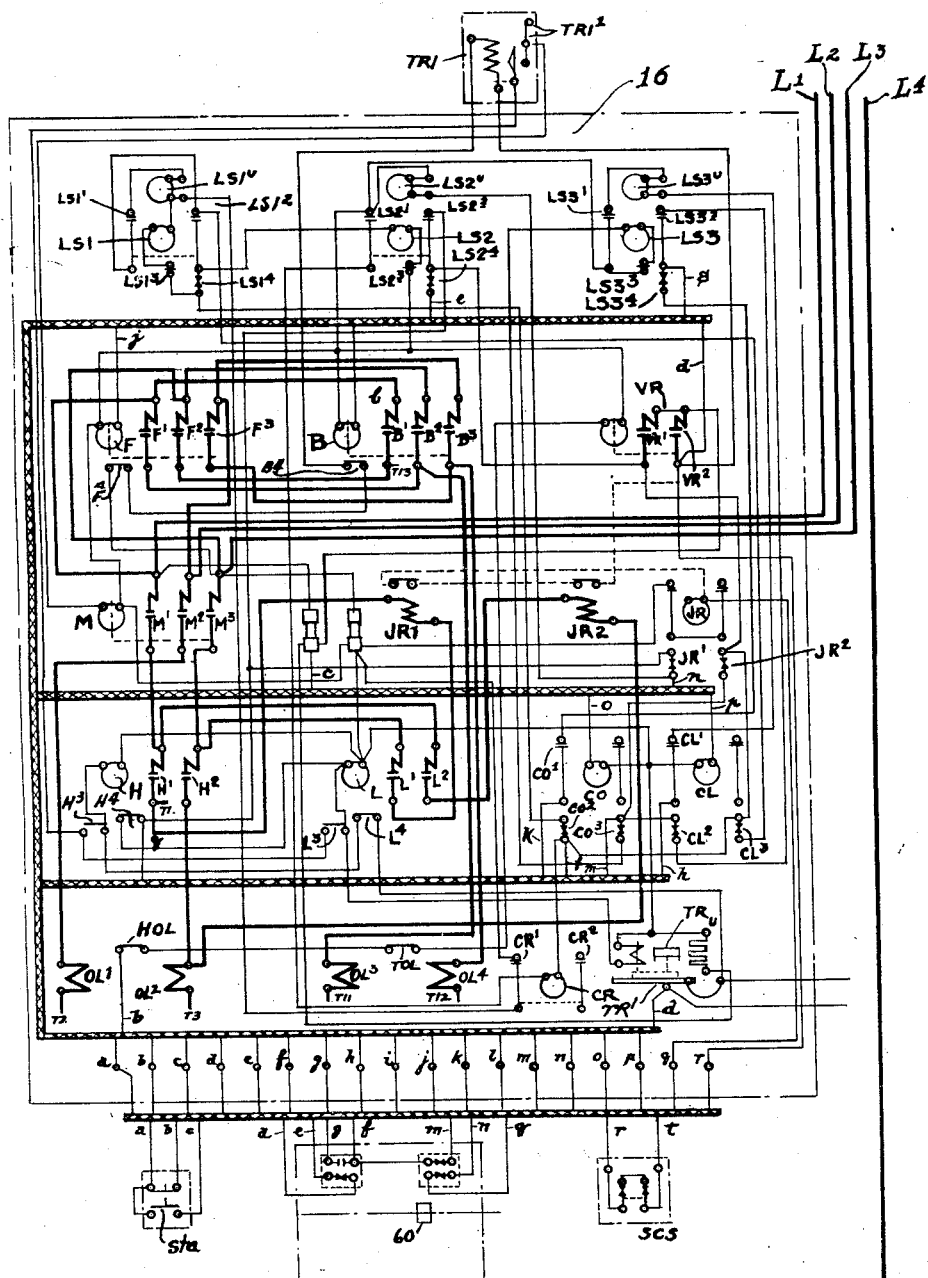

Fig. 3a diagrammatically illustrates selector mechanism.

Fig. 4 is a front elevation on enlarged scale of the bucket and trolley shown in Fig. 1.

Fig. 4a is a detail view of door-operating and latching mechanism disclosed in Fig. 4 with parts in different position.

Fig. 5 is a side elevation of Fig. 4.

Fig. 6 illustrates on enlarged scale and in more detail, the construction of the bucket loading mechanism of Fig. 2.

Fig. 7 in plan and on enlarged scale, is a detail view with parts broken away of the trolley limit switch of Fig. 1.

Fig. 8 is a detail view of the slack cable switch shown in Fig. 1a.

Fig. 9 is a wiring diagram of the electrical control panel shown in Fig. 1.

Fig. 10 is a wiring diagram of the silo selector and of the limit switches of Fig. 7.

Fig. 11 is a simplified wiring diagram of the control panel of Fig. 9 utilized in explanation of operation of the control system.

Fig. 12 is a simplified wiring diagram of the hoisting and trolley motors of Fig. 1.

Referring to Figs. 1, 1a and 2 in particular, for general description of the operation of the system therein shown, the bucket 1 loaded from a hopper 2 disposed beneath the open bottom of a railroad car 3 is hoisted by motor 4 from the loading station along the inclined runway or tracks 5 into engagement with or adjacent the travelling carriage or trolley 6. The raising of the loaded bucket is effected by cable 7, one end of which is anchored by suitable fastening means 8 to silo #1, the other end of the cable 7 being fast to drum 11 to which is also fastened one end of a cable 7a whose other end is secured to the sheave 9 supporting the counterweight 10.

As the winding drum 11 driven by motor 4 through a suitable speed reducing mechanism 4a rotates in clockwise direction, as viewed in Fig. 1a, the loop 12 of the cable 7 which hangs between pulleys 13, 13 of the trolley 6 and supports bucket 1 by its pulley 14 shortens, raising the bucket to at least sufficient extent to permit the bucket wheels 15 to leave the tracks 5, the bucket then being suspended from and supported by the trolley.

At this point, by means of electrical apparatus, preferably grouped on the control panel 16 associated with limit switches within the switch casing 17, and hereinafter fully described, the motor 4, which is preferably of the high-torque squirrel cage type is de-energized. Simultaneously, an electric brake, in circuit with the motor sets to prevent movement of drum 11. At a suitable time thereafter, or substantially immediately, the trolley motor 18 is energized to effect through suitable speed reducing mechanism 18a, movement of the trolley or carriage 6 and bucket 1 in the desired direction and until it arrives substantially centrally of the silo determined by setting of the silo selector 19.

As disclosed in Fig. 1, the cables 20 and 20a, each having an end fast to the winding drum 21 and an end fast to the trolley 6, form a closed loop which passes over the idler sheave 20b at the end of silo #1.

Preferably and as indicated, the trolley is supported by a track or rail 22 extending from one end of the row of silos to the other, the openings 23 in the silos being of proper dimensions to permit passage of the trolley and the raised bucket.

When the trolley and bucket arrive substantially central of a pre-selected silo, limit switch mechanism within the casing 24 cooperates with electrical apparatus mounted on the control panel 16 to de-energize the trolley motor 18, which is usually of the same type as the hoisting motor, and to set its associated brake. Preferably before it is lowered and during an interval afforded by the electrical control system, the bucket is permitted to come substantially to rest, the more or less sudden stopping of the loaded bucket causing it to swing.

With the bucket ready for lowering, the control system again energizes the hoisting motor for rotation in reverse direction to effect descent of the bucket into the body of the silo. Engagement between the accumulation of material, as coal, grain, ore, or other substance within the silo, whose height is of course variable and determined by the amount previously dumped therein, the amount removed, etc., and the bottom of the bucket releases latching mechanism to permit escape of its contents. Simultaneously therewith the circuit of motor 4 is broken, as by a slack cable switch having an arm 25 and which is functionally a limit switch, to stop further lowering, and immediately or at a predetermined interval thereafter, as desired, the motor 4 is re-energized for rotation in reverse direction to hoist the emptied or emptying bucket.

When the empty bucket reaches the trolley, the hoist motor 4 is de-energized and the trolley motor 18 energized for rotation in proper direction to return the trolley and bucket to a position approximately over the runway 5. At this point the trolley motor is de-energized, and preferably after a suitable interval in which the bucket may stop oscillation, which interval is afforded by the automatic control system, the motor 4 is again energized for rotation in proper direction to lower the bucket.

Upon arrival of the bucket at the loading station, the motor 4 is de-energized. The fixed part 26 of the loader attached to hopper 2 may be provided with a valve and chute member 27 actuated by the bucket to afford automatic re-loading, in which event after an interval predetermined by the automatic control apparatus of panel 16, or generally during which the bucket is refilled, the motor 4 is again re-energized and the cycle of operations repeated indefinitely and without necessity of intervention of an operator. However, if desired, an operator may actuate a valve or gate for the hopper, or in general manually effect loading of the bucket or any other material supporting structure utilized. The bucket which per se is not part of the present invention is described and claimed in Patent No. 1,965,397.

It may be desired to store one size or grade of coal, stone, or other material in one silo or bin and other sizes or grades in other bins respectively, or when one silo is filled to discharge into another silo. Without interrupting the operation, an operator, preferably while the bucket is being loaded, may select any other silo of the group and material will be loaded in that silo by repeated operation of the conveyer until the supply is exhausted, the system stopped, or still another silo selected.

The trolley and hoisting motors, the limit switch casings 17 and 24, the control panel 16, and the silo selector 19 are preferably all located adjacent each other, as in a control house. It is an important feature of my invention that all of the automatic control operations are effected by apparatus which may be and preferably is within the control house avoiding the necessity of exposed wiring and switching mechanisms.

It will be understood that the silos are only one example of unloading or discharge stations, and that the hopper is generically illustrative of a loading point. The system illustrated may be utilized to transport coal, grain, sand, gravel, stone and the like. It is within the scope of my invention, however, to substitute for the bucket, any other type of material-supporting structure as a platform, sling, hooks, etc., suitable for the particular use to which the system is put. The buckets or other material-supporting structure may be loaded or emptied manually, and the system modified to stop at either or both the unloading or loading stations, until reverse sequence of steps is initiated manually, as by push buttons.

It is also within the scope of the invention to load at several pre-selected points and to discharge at a single point, which amounts to mere reversal of the loading and unloading stations; the bucket shown and hereafter described to be replaced, if necessary or desirable, by other structure suited to the nature of the material to be transported and the specific conditions of operation.

Particularly for use in the silo system illustrated, I prefer to use the bucket construction shown in Figs. 4 and 5. As the bucket is preferably vertically disposed at all times, the line of centers of shafts 28 extending from the sides of the bucket and upon which the wheels 15 are mounted is parallel to the runway or tracks 5. The open bottom of the bucket is provided with doors 29 hinged substantially centrally of the bucket, their pivotal axes being at right angles to shafts 28. The outer ends of the doors 29 are connected by the links 30 and 30a and comprise therewith a toggle mechanism. With the doors closed as in Fig. 5, the line of centers of the pivots 31 and 32 is above pivot pin 33 connecting the links 30 and 30a, the weight of the doors, levers, and the contents of the bucket tending to force the pivot 33 downwardly, which however, is restrained from movement by engagement of the finger 34 of the lever 30a with the abutment 35 of lever 30.

When the trigger member 36 depending from pivot 33 engages the top of the pile within the silo, the pivot 33 is raised breaking the toggle, the weight of the material within the bucket opening the doors 29 to permit its discharge, Fig. 4a.

As the empty bucket is lowered at the loading station, the cam 37 which increases in width toward the bottom of runway 5 engages the levers 30 and 30a effecting closing of the doors and resetting of the toggle for holding them closed. The sides of the bucket which are parallel to the trolley rail 22 extend beyond the top of the bucket proper and provide bearings for a pivoted cross-support structure 38 upon which is mounted the spaced arms 39 which receive the shaft 40 of the bucket pulley 14. The bumpers or buffers 41 whose upper faces engage the stop members 42 secured to and extending below the trolley 6 are mounted, preferably resiliently, on the cross-support 38 of the bucket.

It will be understood that when the loading station is in line with the trolley track instead of at an angle thereto as in the example shown in Fig. 2, the shafts 28 for bucket wheels 15 will be at right angles to the position shown and the position of the other bucket parts, as doors 29, etc., will be correspondingly changed. Further, the runway in either instance need not be inclined throughout but may be, for example, more or less vertical for a substantial distance below the trolley rail.

Referring to Fig. 6, the hopper 2 is provided at the bottom with a fixed spout 26 to the end of which is pivoted at 44 the valve and chute member 27 which is biased by the counter-weight 46 so that in the absence of a bucket at the loading station the nose is tilted upwardly, the valve portion 27A thereof closing the end of the spout. The stop 48 is adjusted so that the outermost part of the nose clears the top edge of the front wall 49 of the bucket as it descends, the lower edge of the pivoted cross-support 38 of the bucket however, engages the nose of the pivoted chute 27 and forces it into the bucket to the position shown in Fig. 6.

Referring to Fig. 7, there is shown one type of limit switch mechanism for the trolley motor which is illustrated principally for purposes of explanation as many specifically different constructions may be utilized. The mechanism within the housing 24 (Fig. 1) consists of a threaded shaft 55 suitably driven from the shaft of the trolley winding drum 21 as by a chain 56, or equivalent, engaging the sprocket 57 secured to the end of shaft 55 exteriorly of housing 24.

The cam member 58 which is threaded on shaft 55 and prevented from rotation by the guide bar 59 moves axially along shaft 55 as the latter rotates, its cam members 60 engaging the adjustable, pivoted contact members of the limit switches TL1, TL2, TL3, etc., which correspond in number to the unloading points or silos, and the adjustable, pivoted switch arms of limit switches TLO2, TLO3, etc., which correspond in number to the loading points.

The several limit switches are so adjusted, as by shifting them along slots 61, that a cam 60 engages the limit switch corresponding to a particular silo when the trolley arrives substantially centrally of that silo. The distance between each of the limit switches TL1, TL2, etc., and each of the limit switches TLO2, TLO3, etc., is directly related to the distance between the respective silos and the loading stations and the grouping of the limit switches TL1, TL2, etc., on one side or the other of the switches TLO2, TLO3, corresponds to the grouping of the silo on one side or the other of the loading station.

As is hereinafter more fully explained, to effect travel of the trolley and bucket or load carrier to within a chosen silo or to an unloading point, a control circuit is established including the limit switch, as TL2 for example, corresponding to silo #2. When the trolley arrives at that point, a cam 60 operates the limit switch to prevent further movement of the trolley, as by effecting de-energization of the trolley motor 18. A limit switch, TLO2, for example, as will hereinafter appear, is opened by the travelling cam when the trolley returns to its position over runway 5, for de-energizing the trolley motor and for initiating lowering of the bucket for reloading.

The limit switch mechanism within housing 17 is generally similar in construction to that just described in that it employs a travelling cam which engages adjustable switch operating members at the upper and lower limits of travel of the bucket for the hoisting and lowering operations respectively. Specific illustration and further description of the hoist limit switch is not necessary, though mention is made that the chain 62 or equivalent drives the travelling cam shaft within housing 17 from the shaft of the hoist drum 11.

Referring to Fig. 8, the slack cable switch SCS, previously referred to, may comprise an arm 25 carrying a sheave 63 bearing against the cable 7 intermediate the winding drum 11 and the bucket 1. When the loaded bucket strikes the top of the pile within a silo, the cable to the bucket becomes slack, permitting the counterweight 64 to move arm 25 in counter-clockwise direction rotating the cam 25a which engages the switch arm roller 25b to break the circuit between the contacts of the switch SCS within the switch housing stopping further lowering, as more fully hereinafter described. The sheave guard 63a prevents the cable from disengaging sheave 63.

In Fig. 10, there is shown a loading or unloading point selector 19 connected by electric-cables 66 and 67 to the control panel 16 and the trolley limit switch 24. The contact arm 68 which is connected to the manually adjustable dial 69 (Fig. 3) may be moved thereby into engagement with any of the contacts 71—77, the index 78 (Fig. 3), cooperating with dial 69 to indicate the silo selected as a discharge station. The contacts 71—77 are in circuit with the limit switches TL1—TL7 respectively so that for example when the dial is set to the numeral 2 as indicated in Fig. 3, the contact arm 68 is in engagement with contact 72 connected to the trolley limit switch TL2 which will stop the trolley 6 centrally with silo #2, as the travelling cam 60 opens switch TL2 when the trolley arrives in that position.

In the installation shown in Fig. 1 some of the silos are to the right of bucket runway 5 and others are to the left. The trolley motor therefore in moving the loaded bucket "forward", that is away from the loading station, toward silo #1 for example, must rotate in the same direction as it does to return an empty bucket "backward" from for example, silo #5, to the bucket runway. A reversing switch RS is provided to ensure movement of the trolley in proper direction, regardless of on which side of the loading station the selected silo is located. The reversing switch is in effect a two-pole, double throw switch whose movable element is preferably mechanically connected to the selection switch arm 68 so that as the arm 68 moves from a contact as 72, (corresponding to silo #2 to the left of runway 5) to contact 73 (corresponding to silo #3 to the right), the arms 79, 79 of the reversing switch move from the arcuate contacts 80, 80 to the other pair of arcuate contacts 81 to reverse the control circuits of the trolley motor.

When the silos are all on the same side of the runway, the reversing switch, if provided, is set on the proper side and mechanically decoupled from the silo selector contact arm.

The control panel 16, with its electrical equipment and wiring is shown in Fig. 9. The auxiliary timing relay TR1 having contacts TR1' at the top of the figure is of that known type in which there is a time interval, preferably adjustable, after energization of the relay winding before the relay contacts are closed. The latching relays LS1, LS2, and LS3 having trip coils LS1$^v$, LS2$^v$ and LS3$^v$ are each provided with one pair of contacts which are closed and a second pair of contacts which are open when the relay is "in", the first pair of contacts being open and the second pair of contacts being closed when the relay is "out." The electro-magnetic switches F and B for controlling the energization and direction of the trolley motor each have three contacts which are open and a fourth contact which is closed when the switch winding is de-energized, the first three contacts closing and the fourth contact opening upon energization of the winding. Further, the contact structure of the two switches are mechanically interlocked so that when one switch is "in" the other is "out." The relay VR is an under-voltage relay whose contacts VR$^1$ and VR$^2$ are closed while the system is in operation, cutting the entire system out of circuit however, if and when the line voltage becomes unduly low for any reason. The electromagnetic switch M having contacts M$^1$, M$^2$, M$^3$ controls the power circuit of the hoist motor 4. The hoist motor overload relays JR1 and JR2 in circuit during lowering of the bucket by the hoist motor may be utilized to interrupt the hoist motor circuit when the bucket engages the top of the pile within a silo. Relay JR is energized at all times during operation maintaining its contacts JR$^1$, JR$^2$ in closed circuit position except when temporarily de-energized by the slack cable switch SCS, (or relays JR1, JR2) which is used to stop the hoist motor when the loaded bucket reaches the top of the material in a silo. The directional relays H and L, each having three contacts which are open and a fourth contact which is closed when the relay is de-energized, reverse the hoist motor connections to effect the hoisting and lowering operations. Their contact structures are mechanically interlocked so that when one is "in" the other is "out." Relays CO and CL each having a contact which is open and a pair of contacts which are closed when the relay coils are de-energized cooperate with the trolley limit switches and the latching relays as hereafter described. The hoist overload relay OL$^1$, OL$^2$ and trolley overload relay OL$^3$, OL$^4$ are provided with contacts HOL and TOL respectively which are in series with the winding of under-voltage relay VR for interrupting operation of the entire system upon excessive overload of either the hoist or trolley motors. The main timing relay TR is of the known type in which the contacts do not engage until a predetermined time, preferably adjustable, after de-energization of the relay winding.

All power for the motor and control circuits is supplied from the lines L1, L2 and L3, furnishing three phase alternating current of commercial voltage and frequency. For a two-phase four wire system, lines L1 and L3 are connected to one phase, and lines L2 and L4 to the other phase conductors. Direct current may be used by changing the motors and the power switches; the control system, which is across one phase of the A. C. system illustrated, may remain the same.

The conductors entering and leaving the cables of the control panel and the cables to silo selector and trolley hoist limit are identified by reference letters a–t, but for convenience in detailed explanation of the complete system attention is directed to the simplified diagram of Fig. 11 in which the circuit relations are more clearly discernible and the connections between the control elements simpler to trace.

For convenience in the following description of the operation of the electro-mechanical control system, the latching relays LS1, LS2 and LS3 will be referred to as "in" when their upper contacts are closed, and their back contacts open; and as "out" when their upper contacts are open and their back or lower contacts are closed. For example, when the relay LS1 is "in", its contacts LS1$^1$ and LS1$^2$ are closed and its contacts LS1$^3$ and LS1$^4$ are open; and when the relay LS1 is "out", its contacts LS1$^1$ and LS1$^2$ are open and its contacts LS1$^3$ and LS1$^4$ are closed. When the installation is originally made and the system ready to operate with a bucket at the loading station ready for hoisting, the relays LS1 and LS3 are manually set "in" and the relay LS2 set "out". Thereafter the proper relation of the relays for the different steps of operation is automatically maintained.

Starting with the bucket loaded at the hopper, an operator presses the starting button Sta (Fig.

11) which completes a circuit through the winding of the no-voltage relay VR, the stopping switch Sto, the contacts of the hoist overload relay HOL and the trolley overload relay TOL being closed. The contact $VR^2$ of the voltage relay completes a sealing in circuit in shunt to the starting button which is permitted to return to open position. The current flows through the no-voltage relay contacts $VR^1$, the closed contacts $LS2^4$, $FLH^2$, $TR1$, and $L^4$, to energize the winding H of the directional hoisting motor contactor, which thereupon moves its contacts $H^1$, $H^2$, in the power circuit of the hoist motor to closed circuit position, (Fig. 12). The contact $H^3$ of the same contactor is also moved to closed circuit position to complete through contact $TR1^1$ the circuit including the winding M of the main contactor whose contacts $M^1$, $M^2$, and $M^3$ are moved to closed circuit position to complete the power circuit of the hoisting motor and simultaneously to effect release of the motor brake by energization of the brake solenoid BS. There is an appreciable interval of time between the pushing of the starting button and the energization of the main contactor, as the contacts $TR1^1$ do not move immediately to closed circuit position but after an interval determined by the construction or setting of the auxiliary timing relay whose winding TR1 was energized upon depression of the starting button. The timing relay TR1 and its contacts $TR1^1$ may be of any known or usual construction.

The hoisting motor continues to operate until the loaded bucket reaches the carriage, whereupon its circuit is broken by engagement of the traveling hoist cam 60' with contact $FLH^2$ of the final limit hoisting switch, the de-energization of the brake solenoid immediately stopping the motor.

When the starting button was pressed the control relay winding CL was energized through the silo selector arm 68 and the corresponding silo limit switch $TL^n$ closing contact $CL^1$ of the relay. With the bucket at the upper limit of its travel from the loading station, the traveling hoist cam 60' closes the contacts $FLH^1$ of the final limit hoist switch completing a circuit through the winding F of the forward relay which thereupon closes the power circuit of the trolley motor through the contacts $F^1$, $F^2$ and $F^3$. When the trolley or carriage arrives within the selected silo, the trolley traveling cam 60 engages the limit switch $TL^n$ corresponding to that silo de-energizing the control relay winding CL whose contact $CL^1$ moves to open circuit position to break the circuit of the winding F of the forward relay. Consequently the contacts $F^1$, $F^2$ and $F^3$ move to open circuit position breaking the trolley motor circuit and setting the motor brake. Simultaneously with opening of the trolley motor circuit, the contact $F^4$ of the "forward" relay moves to closed circuit position to effect energization of the winding TR1 of the auxiliary timing relay for a purpose hereinafter mentioned.

When the control relay winding CL was de-energized by the trolley traveling cam, its contact $CL^3$ moved to closed circuit position completing a circuit through the relay winding LS2 which thereupon closed the contact $LS2^2$ to complete through contact $H^4$, a circuit through the lowering relay L whose contacts $L^1$ and $L^2$ reverse the connections of the hoisting motor and whose contact $L^3$ closes. When the contact $TR1^1$ of the timing relay also closes the circuit of the main contactor M is completed for energizing the motor to lower the bucket. During the time afforded by the retarded action of the contact $TR1^1$ the loaded bucket comes substantially to rest before being lowered. The energization of the relay winding LS2 also closed contact $LS2^1$ for completing a circuit through the control relay winding CR which thereupon closed its contact $CR^1$ to energize the latching relay winding $LS1^u$. This latching relay LS1 thereupon moves to "out" position, that is, the contacts $LS1^2$ and $LS1^1$ opened, and $LS1^4$ and $LS1^3$ closed.

The bucket is lowered by the hoisting motor until it engages the top of the mass of material within the silo which engagement breaks the latching toggle for the doors and causes the hoisting cable to become slack. The slack cable switch ScS thereupon moves to open circuit position de-energizing the relay winding JR permitting the relay contacts $JR^2$ to close, completing the circuit of the latching relay trip coil $LS3^u$ through the closed contacts $CL^2$ of the de-energized control relay CL. Simultaneously, the de-energization of winding JR completes through its contact $JR^1$, and contact $LS2^2$, the circuit of the tripping winding $LS2^u$. At this point in the operation all of the latching relays are "out". Energization of the tripping coil $LS2^u$ moves the contact $LS2^4$ to closed position completing the circuit of the hoist contactor H which closes contacts $H^1$, $H^2$, again reversing the connections with the hoist motor. The contact $H^3$, of relay H completes the circuit of the main contactor M for hoisting the empty bucket.

As the pile within the silo increases in height, the extent of lowering of the bucket therein and the extent of subsequent hoisting to the trolley correspondingly decreases, the system accommodating itself to the height of the pile.

During the lowering of the bucket, the winding TR was energized opening the contact $TR^1$ in series with the hoisting relay H so that a predetermined interval elapses after the bucket strikes the pile before the hoisting relay is energized to raise the bucket. If desired the reversal may be immediate with no delay within the silo by shunting the timing relay contact $TR^1$ by a switch TLO' which is in closed position except when the trolley is in position for receiving a loaded bucket. Switch TLO' when used is preferably actuated by the trolley traveling cam and is at the same position as switch $TLO^2$. By providing switch VT, there is permitted choice of immediate reversal of the bucket within the silo (VT closed) or an appreciable time before the lowering of the loaded bucket and its subsequent hoisting in emptied condition (VT open).

When the empty bucket arrives at the trolley, the contact $FLH^1$, is closed by the hoist traveling cam to complete through the contacts $LS3^4$ and $CO^1$ the circuit of the backward relay B which closes its contacts $B^1$, $B^2$, and $B^3$ to connect the trolley motor to the power supply, reversing its connection so that it runs in proper direction to return the bucket and trolley to a point above the loading station, at which point the trolley traveling cam opens the contacts $TLO^2$ to de-energize the winding CO, effecting opening of the contacts $CO^1$, breaking the circuit of the breaker relay and therethrough effecting de-energization of the trolley motor by opening of contacts $B^1$, $B^2$ and $B^3$. The de-energization of winding CO also effects closure of the contact $CO^2$ completing a circuit through the latching relay winding LS2 through contacts $LS1^4$ and $LS2^3$, which in turn by closing its contacts LS2¹ energizes the relay winding CR to close contacts CR1 of that relay completing the circuit of latching relay winding LS1 through contacts CO² and LS1³. The de-energization of the winding B of the backward relay effects closure of the contact B⁴ to energize the winding of the auxiliary timing relay TR1. In moving to its "in" position the latching relay LS2 closes its contact LS2² energizing the lowering relay L which by closing its contacts L¹ and L² reverses the connections of the hoisting motor for the lowering operation, and closes contact L3 so that when the contacts TR1¹ of the timing relay close, the main contactor M is energized to complete the hoisting motor circuit. In the interval afforded by the timing relay, the empty bucket comes to rest substantially in line with the tracks or guides thereto.

The hoisting motor continues to lower the empty bucket until the hoist traveling cam engages the final lower limit contacts FLL² completing the circuit of the relay winding LS2ᵘ of the latching relay whose contacts LS2⁴ thereupon move to closed circuit position. When the contacts TR¹ of the main timing relay which was energized during the lowering operation, return to closed position, a predetermined time after de-energization of the winding TR, the hoist contactor winding H is energized to again initiate the cycle of operation. Whether or not the switch VT is closed or open, to effect immediate or retarded reversal of the hoisting motor work with the bucket at the silo, the relay TR affords a time interval for loading, since although switch VT may be closed, switch TLO¹ is opened by the trolley cam when the trolley is at the loading station which opens the circuit including these two switches in shunt to the timing relay contacts TR¹.

Instead of the slack cable switch SCS, there may be provided as shown contacts JR1¹ and JR2¹ associated with overload relay windings JR1 and JR2 in circuit with the lowering contacts L1, L2 of the hoisting motor. When the bucket lowered in the silo engages the material therein, or the bottom of the silo, if empty, the counterweight 10, Fig. 1a, which normally balances the hoisting cable so loads the hoisting motor that the current flowing through coils JR1 and JR2 is sufficiently large to open contacts JR1¹ and JR2¹ breaking the circuit of relay winding JR which as above described operates to reverse the hoisting motor through the agency of the latching relays LS1 and LS2. By providing switches S and O, preferably mechanically interlocked as indicated by the dotted lines to effect opening of one when the other is closed, there is afforded choice of either arrangement.

An operator can stop the system with the trolley or bucket in any position by depressing the stop button "Stop" on the silo selector panel 19, which de-energizes the under-voltage relay VR. As a safety precaution, or if the operation is to be suspended indefinitely, the stop button may be rotated to "Safe" as indicated by the arrow thereon which prevents the contacts of the stop switch from re-engaging when the operator's finger is removed from the button. To resume operation, with the stop button in the "On" position in which its contacts are in engagement, the starting button "Sta" is pressed and the unfinished cycle is completed.

The direction of the trolley may be changed manually by pushing the "forward" or "reverse" buttons on the silo selector panel which change the connections to the reversing switch of the silo selector. Pressing of these buttons will not change the course of the bucket while hoisting or lowering. Another safety feature of the system described is that if the dial pointer is set between two silo numbers, or if the dial is set to indicate a silo already passed, the bucket will proceed through its cycle but will not lower, the trolley motor being de-energized by limit switches (not shown) when cam 60 passes beyond the last silo limit switch TL1 or TL7 depending upon the direction of travel. Preferably, the dial 69 should be rotated to select a new silo, bin, or unloading station only when the bucket is in loading position.

If for any reason, it is desired to change the direction of movement of the bucket at any point during a cycle, the stop button is pressed and the latching relays set manually as indicated by the chart below:

| Motion desired | Latching relays | | |
|---|---|---|---|
| | LS1 | LS2 | LS3 |
| Hoisting from track hopper | In | Out | In |
| Travel toward bin or silo | In | Out | In |
| Lowering in bin or silo | Out | In | In |
| Hoisting from bin or silo | Out | Out | Out |
| Travel reverse to track hopper | Out | Out | Out |
| Lowering to track hopper | In | In | Out |

For example, if the trolley and bucket are moving from the track hopper and it is desired to reverse their direction, the latching relays LS1 and LS3 which are "in" are manually moved "out". The starting button is then pressed and the bucket and trolley move in the desired direction.

The "Stop" button may be pressed at the end of each step, or between steps, and the "Start" button depressed to effect resumption of operation, or as above mentioned the relay LS1, LS2, and LS3 may be set to effect movement in reverse direction, the several steps being then automatically performed in sequence until the "Stop" button is again depressed.

The selection of the loading stations is effected by manually moving the pointer 82 to the corresponding identification character of the station, Fig. 3, which operates the switch 83 to cut limit switch TLO2 out of circuit and to include limit switch TLO3, corresponding to the selected loading station, in circuit. Assuming that the selected loading station is between silos #5 and #6, limit switch TLO3 is suitably positioned between limit switches TL5 and TL7. The silo grouping is now, as viewed in Fig. 1, two to the right of the loading station and five to the left, instead of five to the right and two to the left. To preserve operation in accordance with the settings of the silo selector 69, any one of several expedients may be resorted to. As above indicated, the relative position of the arms 79 of the reversing switch and silo selector 68 may be changed to correct for the re-grouping of the silos. Or there may be several indexes 78, each properly identified to correspond to the load-station selector positions. For example, if there are three loading stations, the pointer 82 may be moved to positions A, B or C and the dial 69 will be set according to the corresponding index. These latter indexes are so spaced that arms 79, 79 of the reversing switch move from contacts 80 to contacts 81 or vice versa, as the dial 69 is moved successively to bring opposite the proper silo index, numbers of silo lying in opposite directions from the loading station corresponding to that index.

Still another arrangement is diagrammatically shown in Fig. 3a. The selector 82 is mechanically coupled, as by belt 84, to plate 85, each carrying a set of contacts 80, 81 of the reversing switch so that they assume a new position with respect to arm 79 of the reversing switch for each corresponding position of the loading station selector.

It will be understood that insofar as some aspects of my invention are concerned, and in the system specifically illustrated and described, the bucket 1 may be replaced by other structure capable of supporting the material to be transported and that at either the loading or unloading points, or both, the system may stop for loading or unloading, an operator pressing a switch button to cause movement of the conveyer to the other extreme position. The latter may be effected by substituting for switch contacts actuated by a relay, switch contacts which are manually operable. For example, if the contacts LS2ª are divorced from the relay LS2, the bucket, or equivalent, will not be hoisted either from the loading station or the bin until these contacts are manually closed, the bucket then moving to the other station for loading or unloading, as the case may be.

My invention is not limited to the particular arrangement shown but is of the scope defined by the appended claims. For brevity of the claims, the terms "loading" and "unloading" as applied to the stations or points are to be considered interchangeable, unless this results in inconsistency.

What I claim is:

1. A conveyer system comprising loading and unloading stations, a control station, a carriage, an electric motor at said control station for moving said carriage between loading and unloading stations, a material-supporting structure adapted to be transported by said carriage, a second electric motor at said control station for hoisting and lowering said structure toward and away from said carriage, means responsive to movement of said structure to loading position for effecting flow of material to be transported into the interior thereof, relays located at said control station for controlling the energization and direction of rotation of said motors, switch structure driven by said motors for controlling relays automatically to effect lowering and hoisting of said structure at said stations and travel of said carriage between said stations, and a slack-cable switch actuated when said structure engages at the unloading point material previously transported thereto for controlling said relays to effect reversal of said second motor to hoist said structure, all elements of the electro-mechanical control apparatus being located at said control station.

2. A conveyer system comprising at least one loading station and a plurality of unloading stations, a control station, a carriage, an electric motor for driving said carriage, material-supporting structure, a second electric motor for hoisting and lowering said structure toward and away from said carriage, limit switches adapted to be operated by movement of said structure, switching means manually operable at said control station to select any desired unloading station by inclusion in circuit of the carriage limit switch corresponding thereto, and a control system including said limit switches for effecting operation in proper sequence of said motors to move said carriage between a loading station and the selected unloading station and movement of said structure at at least one of said stations.

3. A conveyer system comprising at least one loading station and a plurality of unloading stations, a control station, a carriage, an electric motor for moving said carriage toward and away from a loading station, material-supporting structure, a second electric motor for hoisting and lowering said structure toward and away from said carriage, limit switches adapted to be operated by movement of said carriage, limit switches adapted to be operated by movement of said structure, switching means manually operable at said control station to select any desired unloading station by inclusion in circuit of the carriage limit switch corresponding thereto, relays controlling the energization and direction of rotation of said motors, and a control system including said limit switches and said relays for effecting operation in proper sequence and direction of said motors to move said carriage back and forth between the unloading station and the selected loading station and hoisting and lowering of said structure at at least one of said stations.

4. A conveyer system comprising a loading station and unloading stations in different directions from said loading station, material-conveying structure, an electric motor, relays for controlling the energization and direction of rotation of said motor, limit switches adapted to be operated in response to position of said structure at said stations for actuating said relays, means for manually selecting the unloading station comprising switching mechanism for including in circuit the corresponding limit switch, and manually operable means for determining the order of operation of said relays to effect movement of said structure toward the selected unloading station.

5. A conveyer system comprising a loading station, unloading stations in different directions from said loading station, material-conveying structure, an electric motor, relays for controlling the energization and direction of rotation of said motor, limit switches adapted to be operated in response to position of said structure at said stations for actuating said relays, means for manually selecting the unloading station comprising switching mechanism for including in circuit the corresponding limit switch, and switching mechanism operable in unison with said manually operable means to determine proper order of operation of said relays for effecting movement of said structure between the loading station and the selected unloading station.

6. A conveyer system comprising material-conveying structure, a winding drum, a counterweight, cables passing around said drum and connecting to said counterweight and said structure, an electric motor for driving said drum, a relay for controlling the de-energization of said motor, and means responsive to increase of current in said motor circuit for actuating said relay to de-energize said motor when said structure meets obstruction to its movement and said counterweight overloads said motor.

7. A conveyer system comprising material-conveying structure, a winding drum, a counterweight, cables passing around said drum and connecting to said counterweight and said structure, an electric motor for driving said drum, relays for controlling the energization and direction of rotation of said motor, and means in said motor circuit responsive to increased current for controlling said relays to effect reversal of said motor when said conveyer structure meets obstruction to its movement thereby causing said counterweight to overload said motor.

8. A conveyer system comprising at least one loading station and at least one unloading station, a carriage, an electric motor for moving said carriage, material-supporting structure, a second electric motor for lowering said structure, limit switches for stopping said first motor upon arrival of said carriage at said stations, a single retarded-action relay actuated by the limit switches of both stations for effecting lowering of said structure at both stations by said second motor after a predetermined time interval, and means for excluding said relay for movement of said carriage from said stations with said structure in hoisted position.

9. A conveyer system comprising at least one loading station and a plurality of unloading stations, a carriage, an electric motor for moving said carriage between loading and unloading stations, material-supporting structure, a second motor for hoisting and lowering said structure toward and away from said carriage, relays controlling the energization and sense of rotation of said motors, limit switches controlling said relays to effect movement of said carriage between stations and hoisting and lowering of said structure at stations by energization of said motors in proper sequence and sense of rotation, a control station at which said relays, said limit switches and said motors are disposed, and switch means manually operable at said control station to select the desired unloading station by connecting said relays in circuit with the limit switch of said station.

10. A conveyer system comprising at least one loading station and at least one unloading station, a control station, a carriage, an electric motor for moving said carriage between stations, material-supporting structure, a second motor for hoisting and lowering said structure toward and away from said carriage, relays controlling the energization and sense of rotation of said motors, means for automatically effecting a complete cycle of movement of said structure comprising limit switches responsive to upper and lower limits, at least one limit being variable, of travel of said structure and position of said carriage at said stations to effect actuation of said relays to stop said first motor upon arrival of said carriage at said stations, to lower and hoist said structure by control of said second motor, and to start movement of said carriage toward the other station by energization of the first motor, and manually operable switching mechanism at said control station for selection of the unloading station between which and the loading station said cycle of movement is effected.

11. A conveyer system comprising at least one loading station and at least one unloading station, a carriage, an electric motor therefor, material-supporting structure adapted to be transported by said carriage, a second electric motor for hoisting and lowering said structure toward and away from said carriage, and an electro-mechanical control system for effecting complete cycle of movement of said structure comprising limit switches responsive to position of said carriage and structure at limits of their travel, a latching relay whose contact position is changed by the carriage limit switches, a second latching relay whose contact position is changed by the lower limit switches associated with said structure, and a third latching relay whose contact position is changed for each change of contact position of said first and second latching relays, the contact positions of said relays and said limit switches for each movement of said structure uniquely determining the subsequent movement thereof.

12. In a system for transporting material, the combination with a hoist motor, and a trolley motor having a loading position and a plurality of unloading positions located on opposite sides of said loading position, means for stopping said trolley motor upon movement thereof in opposite directions into its loading position, means including a selector device adapted to be set in different positions to provide for selective stopping of said trolley motor in its unloading positions, means responsive upon stopping of said trolley motor in its loading or unloading positions to effect a given cycle of operation of said hoist motor including lowering and hoisting operations thereof, and means responsive upon completion of said given cycle of operation of said hoist motor to effect operation of said trolley motor in a selected direction when the same is in its loading position and in an opposite direction when the same is in any of its unloading positions.

13. The combination with a plurality of motors, of control means for said motors including a pair of relays each adapted to selectively control the direction of operation of one of said motors, means associated with one of said relays to effect a given cycle of operation of its associated motor upon stopping of the other of said motors in any one of a plurality of given limits, and means associated with the other of said relays to effect stopping of its associated motor in any of said given limits and to also effect starting thereof in one direction in one of said limits, and in an opposite direction in another of said limits, upon completion of said given cycle of operation of said former motor.

14. In a system for transporting material, the combination with a hoist motor, and a trolley motor having a loading position and a plurality of unloading positions located on opposite sides of said loading position, means for stopping said trolley motor upon movement thereof in opposite directions into its loading position, means including a selector device adapted to be set in different positions to provide for selective stopping of said trolley motor in its unloading positions, means responsive upon stopping of said trolley motor in its loading or unloading positions to effect a given cycle of operation of said hoist motor including a lowering operation, arrest thereof for a given interval after such operation and a hoisting operation, and means responsive upon completion of said given cycle of operation of said hoist motor to effect operation of said trolley motor in a selected direction when the same is in its loading position and in an opposite direction when the same is in any of its unloading positions.

15. In a system for transporting material, the combination with a hoist motor and a trolley motor, of control means for each of said motors including a relay normally in a position to provide for operation of its associated motor in one direction and movable into another position to provide for operation of its associated motor in an opposite direction, and means for controlling said relays to provide a given cycle of operation of said hoist motor upon stopping of said trolley in given limits and to also provide for automatic stopping of said trolley motor in said limits and for automatic restarting thereof upon completion of said given operating cycle of said hoist motor.

16. In a system for transporting material, the combination with a hoist motor and a trolley motor, of control means for each of said motors including a relay normally in a position to provide for operation of its associated motor in one direction and movable into another position to provide for operation of its associated motor in an opposite direction, and means for controlling the relay associated with said trolley motor to effect automatic stopping of said motor in given limits and to also effect automatic restarting thereof in a selected direction in one of said limits and in a reverse direction in another of said limits upon completion of a given operating cycle of said hoist motor, and means for controlling the relay associated with said hoist motor to automatically effect lowering and hoisting operations of said motor upon stopping of said trolley motor in any of said limits.

17. An electrically operated carrier system having a carrier arranged to be operated in a predetermined cycle between a loading station and a selected unloading station, a supporting cable for said carrier, motor means for driving said carrier through said cycle, timing means for controlling said motor means, a switch responsive to the load on said cable for deenergizing said hoisting motor during the lowering operation whenever the load on said cable is substantially removed, the said switch also serving to energize said timing means so that said motor means is energized for raising said carrier after a predetermined time interval.

18. A carrier system having a carrier mounted on a trolley and arranged to be operated in a predetermined cycle from a loading station to and from an unloading station, a hoisting motor for raising and lowering said carrier, a trolley motor for driving said carrier between said stations, electromagnetically operated switches for establishing motor circuits to operate said motors in either direction, means for locking said electromagnetically operated switches in given positions and suited to maintain them in said positions in event of power failure, limit switches responsive to the movements of said carrier, and electrical means responsive to the operation of said limit switches for releasing said locking means.

19. A carrier system having a carrier mounted on a trolley and arranged to be operated in a predetermined cycle from a loading station to and from an unloading station, a supporting cable for said carrier, a hoisting motor for raising and lowering said carrier at said stations, a trolley motor for driving said carrier between said stations, direction switches for controlling the energization of said motors for the transverse and vertical movements of said carrier, a limit switch responsive to the load on said cable for deenergizing said hoisting motor when said carrier is being lowered to said unloading station and for energizing said motor to hoist said carrier from said station, electromagnetically operated sequence relays, and limit switches for controlling the energization of said direction switches, each of said relays being provided with a locking means for mechanically holding said switches in a given position, and electrical means responsive to the operation of said limit switches for operating said locking means.

20. In combination with an electrically operated carrier system having a loading station and an unloading station, a carrier arranged to be continuously raised from said loading station, driven to a point over said unloading station, lowered to and hoisted from said station, and returned to said loading station, hoisting and trolley motors for operating said carrier for said hoisting and transverse movements, a plurality of limit switches operated in response to movements of said carrier, a plurality of sequence relays for controlling the energization of said motors, latching means for each of said relays, and limit switches responsive to the movements of said carrier for continuously operating said relays and said latching means to cause said motors to drive said carrier between said stations, the said latching means insuring the movements of said carrier in the order specified irrespective of power failure.

21. In combination with an electrically operated carrier system having a loading station and a plurality of unloading stations, a carrier arranged to be hoisted from said loading station, traversed to a point over a selected unloading station, lowered to and hoisted from said station and returned to said loading station, motor means for operating said carrier for said hoisting and traverse movements, a plurality of limit switches operated in response to movements of said carrier, a plurality of sequence relays for controlling the energization of said motor means, latching means for said relays, and connections between said limit switches and sequence relays for insuring the movements of said carrier in the order specified irrespective of power failure.

22. In combination with an electrically operated carrier system having a loading station and a plurality of unloading stations, a carrier arranged to be hoisted from said loading station, traversed to a point over a selected unloading station, lowered to and hoisted from said station and returned to said loading station, motor means for operating said carrier for said hoisting and traverse movements, a plurality of limit switches operated in response to movements of said carrier, a plurality of sequence relays for controlling the energization of said motor means, latching means for said relays, connections between said limit switches and sequence relays for insuring the movements of said carrier continuously in the order specified irrespective of power failure, and means associated with said limit switches for selecting any one of said unloading stations.

FREDERICK W. ATZ, Jr.